US009552315B2

(12) United States Patent
Monreal (10) Patent No.: US 9,552,315 B2
(45) Date of Patent: *Jan. 24, 2017

(54) DETERMINING ADDRESSES OF ELECTRICAL COMPONENTS ARRANGED IN A DAISY CHAIN

(75) Inventor: Gerardo Monreal, Buenos Aires (AR)

(73) Assignee: ALLEGRO MICROSYSTEMS, LLC, Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/344,959

(22) Filed: Jan. 6, 2012

(65) Prior Publication Data

US 2012/0131231 A1    May 24, 2012

Related U.S. Application Data

(63) Continuation of application No. 12/354,891, filed on Jan. 16, 2009, now Pat. No. 8,122,159.

(51) Int. Cl.
*G06F 3/00* (2006.01)
*G06F 13/37* (2006.01)
(Continued)

(52) U.S. Cl.
CPC ........... *G06F 13/37* (2013.01); *G06F 13/4068* (2013.01)

(58) Field of Classification Search
None
See application file for complete search history.

(56) References Cited

U.S. PATENT DOCUMENTS 3,074,636 A   1/1963   Baker et al.
4,149,144 A   4/1979   Diefenderfer
(Continued)

FOREIGN PATENT DOCUMENTS

DE   100 30 358 A1   1/2002
DE   102 03 483 A1   11/2002
(Continued)

OTHER PUBLICATIONS

Office Action (with English Translation) dated Oct. 16, 2012, for German Appl. No. 11 2009 004 394.1, filed Jul. 7, 2011, 15 pages.
(Continued)

*Primary Examiner* — Henry Tsai
*Assistant Examiner* — Dean Phan
(74) *Attorney, Agent, or Firm* — Daly, Crowley, Mofford & Durkee, LLP (57) ABSTRACT

In one aspect, a system includes electrical components arranged in a daisy chain that include a first electrical component disposed at a first end of the daisy chain and a second electrical component disposed at an opposite end of the daisy chain than the first end. Each of the first and second electrical components includes an input port, an output port and a common port. The input port of the first electrical component is coupled to one of a supply voltage port or ground and the common ports of the first and second electrical components are coupled to the other one of the supply voltage or the ground. An address of the second electrical component is determined before addresses of the other of the electrical components are determined, and the addresses determine a position of an electrical component with respect to the other of the electrical components.

25 Claims, 8 Drawing Sheets

(51) Int. Cl.
  *G06F 13/40* (2006.01)
  *G06F 13/00* (2006.01)

(56) References Cited

U.S. PATENT DOCUMENTS

| | | | |
|---|---|---|---|
| 4,907,223 | A | 3/1990 | Wroblewski |
| 5,361,260 | A * | 11/1994 | Mito ........................ 370/452 |
| 5,574,849 | A | 11/1996 | Sonnier et al. |
| 5,606,717 | A | 2/1997 | Farmwald et al. |
| 5,646,609 | A | 7/1997 | O'Brien |
| 5,675,811 | A | 10/1997 | Broedner et al. |
| 5,689,689 | A | 11/1997 | Meyers et al. |
| 5,860,022 | A | 1/1999 | Kondou et al. |
| 6,014,137 | A | 1/2000 | Burns |
| 6,112,275 | A | 8/2000 | Curry et al. |
| 6,118,186 | A | 9/2000 | Scott et al. |
| 6,233,534 | B1 | 5/2001 | Morozumi et al. |
| 6,292,494 | B1 | 9/2001 | Baker et al. |
| 6,345,220 | B1 | 2/2002 | Ikegami |
| 6,426,916 | B2 | 7/2002 | Farmwald et al. |
| 6,522,944 | B2 | 2/2003 | Wielebski et al. |
| 6,542,847 | B1 | 4/2003 | Lohberg et al. |
| 6,563,419 | B1 | 5/2003 | Herz et al. |
| 6,618,628 | B1 | 9/2003 | Davlin et al. |
| 6,687,644 | B1 | 2/2004 | Zinke et al. |
| 6,701,214 | B1 | 3/2004 | Wielebski et al. |
| 6,715,020 | B2 | 3/2004 | Farmwald et al. |
| 6,728,819 | B2 | 4/2004 | Farmwald et al. |
| 6,751,696 | B2 | 6/2004 | Farmwald et al. |
| 6,772,254 | B2 | 8/2004 | Hofmann et al. |
| 6,825,625 | B1 | 11/2004 | Karwath et al. |
| 6,838,999 | B1 * | 1/2005 | Ropke ........................ 340/9.16 |
| 6,952,618 | B2 | 10/2005 | Davlin et al. |
| 6,975,558 | B2 | 12/2005 | Farmwald et al. |
| 7,038,412 | B2 | 5/2006 | Karwath et al. |
| 7,110,322 | B2 | 9/2006 | Farmwald et al. |
| 7,158,900 | B2 | 1/2007 | McNutt |
| 7,191,269 | B2 | 3/2007 | Cluff |
| 7,207,014 | B2 | 4/2007 | Velasco et al. |
| 7,209,997 | B2 | 4/2007 | Farmwald et al. |
| 7,254,452 | B2 | 8/2007 | Davlin et al. |
| 7,366,115 | B2 | 4/2008 | Vandensande |
| 7,366,597 | B2 | 4/2008 | Hartrey et al. |
| 7,466,123 | B2 | 12/2008 | Kato et al. |
| 7,558,646 | B2 | 7/2009 | Matsumoto et al. |
| 7,668,674 | B2 | 2/2010 | McNutt |
| 7,717,085 | B1 | 5/2010 | Bauerle |
| 7,761,251 | B2 | 7/2010 | Bauerle |
| 7,774,074 | B2 | 8/2010 | Davlin et al. |
| 7,877,208 | B1 | 1/2011 | Battista |
| 7,990,983 | B2 | 8/2011 | Denham |
| 7,996,104 | B2 | 8/2011 | Wielebski et al. |
| 8,122,159 | B2 | 2/2012 | Monreal |
| 8,290,094 | B2 | 10/2012 | Kolof et al. |
| 8,380,905 | B2 | 2/2013 | Djabbari et al. |
| 8,386,657 | B2 | 2/2013 | Adkins et al. |
| 8,461,782 | B2 | 6/2013 | Ward et al. |
| 8,543,263 | B2 | 9/2013 | Danielsson et al. |
| 8,577,634 | B2 | 11/2013 | Donovan et al. |
| 8,716,674 | B2 | 5/2014 | Sherwood |
| 9,003,096 | B2 | 4/2015 | Trifonov et al. |
| 9,172,565 | B2 | 10/2015 | Cadugan et al. |
| 2001/0011892 | A1 | 8/2001 | Ropke |
| 2002/0010527 | A1 | 1/2002 | Wielebski et al. |
| 2002/0015389 | A1 | 2/2002 | Wastlhuber et al. |
| 2002/0053970 | A1 | 5/2002 | Plummer |
| 2003/0220702 | A1 | 11/2003 | McNutt |
| 2004/0039456 | A1 | 2/2004 | Davlin et al. |
| 2004/0078097 | A1 | 4/2004 | Bruzy et al. |
| 2004/0100394 | A1 | 5/2004 | Hitt |
| 2004/0117537 | A1 | 6/2004 | Vandensande |
| 2004/0233929 | A1 | 11/2004 | Hall et al. |
| 2005/0035733 | A1 | 2/2005 | Karwath et al. |
| 2005/0055132 | A1 | 3/2005 | Matsumoto et al. |
| 2005/0097255 | A1 | 5/2005 | Barenys et al. |
| 2005/0128100 | A1 | 6/2005 | Petrocy |
| 2005/0128830 | A1 | 6/2005 | Nishihara et al. |
| 2005/0132109 | A1 * | 6/2005 | Steger ........................ 710/104 |
| 2005/0228914 | A1 | 10/2005 | Ishida |
| 2005/0267701 | A1 | 12/2005 | McNutt |
| 2005/0273287 | A1 | 12/2005 | McNutt |
| 2005/0289269 | A1 | 12/2005 | Nakayama et al. |
| 2006/0024055 | A1 | 2/2006 | Kawase et al. |
| 2006/0030951 | A1 | 2/2006 | Davlin et al. |
| 2006/0221984 | A1 | 10/2006 | Denham |
| 2006/0224776 | A1 | 10/2006 | Vanderhenst |
| 2006/0282592 | A1 | 12/2006 | Zakriti |
| 2007/0094459 | A1 | 4/2007 | Suzuki et al. |
| 2007/0198139 | A1 | 8/2007 | Boran et al. |
| 2007/0236164 | A1 | 10/2007 | Xia et al. |
| 2007/0236825 | A1 | 10/2007 | Xia et al. |
| 2008/0061725 | A1 | 3/2008 | Wu et al. |
| 2008/0098144 | A1 | 4/2008 | Rees et al. |
| 2008/0115512 | A1 | 5/2008 | Rizzo |
| 2008/0177397 | A1 | 7/2008 | Davlin et al. |
| 2008/0189459 | A1 | 8/2008 | Takeuchi |
| 2008/0288662 | A1 | 11/2008 | Doorenbos |
| 2008/0301344 | A1 | 12/2008 | Hsieh |
| 2009/0031048 | A1 | 1/2009 | Richards et al. |
| 2009/0185081 | A1 | 7/2009 | Ueno et al. |
| 2010/0095035 | A1 | 4/2010 | Chen et al. |
| 2010/0211190 | A1 | 8/2010 | Akita |
| 2010/0231262 | A1 | 9/2010 | Ito |
| 2011/0055442 | A1 | 3/2011 | Ward et al. |
| 2011/0205600 | A1 | 8/2011 | Hibiya |
| 2012/0083902 | A1 | 4/2012 | Daum et al. |
| 2012/0086442 | A1 | 4/2012 | Haas et al. |
| 2012/0158335 | A1 | 6/2012 | Donovan et al. |
| 2012/0325020 | A1 | 12/2012 | Mueller |
| 2013/0197851 | A1 | 8/2013 | Bhawmik |
| 2013/0335068 | A1 | 12/2013 | Dwyer et al. |
| 2014/0086258 | A1 | 3/2014 | Kwan et al. |
| 2014/0258566 | A1 | 9/2014 | Bowling et al. |
| 2015/0100818 | A1 | 4/2015 | Kegel et al. |
| 2015/0227204 | A1 | 8/2015 | Gipson et al. |
| 2015/0236746 | A1 | 8/2015 | Scheinkerman et al. |
| 2015/0236869 | A1 | 8/2015 | Vreeland et al. |

FOREIGN PATENT DOCUMENTS

| | | |
|---|---|---|
| DE | 101 47 512 | 4/2003 |
| EP | 1 467 523 A2 | 10/2004 |
| FR | 2885710 A1 | 11/2006 |
| GB | 2 353 448 | 2/2001 |
| GB | 2353448 A * | 2/2001 |
| JP | H1032479 | 2/1998 |
| JP | H1185806 A | 3/1999 |
| JP | 2003-044972 A | 2/2003 |
| JP | 2003/279651 A | 10/2003 |
| JP | 2006/242908 A | 9/2006 |
| JP | 2007/272807 | 10/2007 |
| JP | 2007-272807 | 10/2007 |
| JP | 2008-22638 | 1/2008 |
| JP | 2010-127857 A | 6/2010 |
| JP | 5827620 B2 | 12/2015 |

OTHER PUBLICATIONS

Freescale Semiconductor, Advance Information "Two-Channel Distributed System Interface (DSI) Physical Interface Device", Document No. MC33790, Rev 11.0, Mar. 2008, 12 pages.

Freescale Semiconductor,Inc., "Distributed System Interface (DSI) Sensor Interface", Document No. MC33793/D, Motorola, Semiconductor Technical Data, Rev 10, Jul. 2003, 24 pages.

International Search Report (Form PCT/ISA/210) and Written Opinion of the International Searching Authority (Form PCT/ISA/237) for PCT/US2009/066068, dated Mar. 4, 2010, 8 pages.

AN1816, Using the HC912B32 to Implement the Distributed Systems Interface (DSI) Protocol; by Tracy McHenry, Motorola, Freescale Semiconductor, Inc., Aug. 1999, 24 pages.

DSI Bus Standard, Version 2.02, TRW Automotive, Launched by Motorola, Freescale Semiconductor, Mar. 29, 2005, 18 pages.

(56) References Cited

OTHER PUBLICATIONS

Notification Concerning Transmittal of International Preliminary Report on Patentability (Chapter 1 of the Patent Cooperation Treaty), PCT/US2009/066068, date of mailing Jul. 28, 2011, 2 pages.
Written Opinion of the International Searching Authority, PCT/US2009/066068, date of mailing Jul. 28, 2011, 4 pages.
Notification of Transmittal of International Preliminary Report on Patentability (Form PCT/IB/326) for PCT/US2010/045403 dated Mar. 8, 2012, 11 pages.
International Search Report and the Written Opinion of the International Searching Authority for PCT/US2010/045403, date of mailing Oct. 18, 2010, 14 pages.
Notice of Allowance dated Feb. 22, 2013, U.S. Appl. No. 12/548,815, pp. 1-10.
Office Action translation dated Jan. 14, 2014, for Japanese Appl. No. 2012-526825, filed Feb. 24, 2012, 3 pages.
Korean Patent Application No. 10-2012-7007744 Office Action dated Mar. 31, 2014, including English translation, 8 pages.
Korean Office Action dated Oct. 29, 2014 (with English translation) for Korean Application No. 10-2012-7007744; 6 pages.
German Office Action (with English Translation) dated Mar. 2, 2015 for German Application No. 112010003388.9; 12 Pages.
Response (with Amended Claims in English) to German Office Action dated Mar. 11, 2015 for German Application No. 112010003388.9; Response filed Jul. 3, 2015; 37 Pages.
Decision to Grant (with Reporting Letter in English) dated Aug. 24, 2015 corresponding to German Application No. 112010003388.9; 18 Pages.
Response (with English Translation) to Korean Office Action dated Mar. 23, 2014 for Korean Application No. 10-2012-7007744; Response filed May 23, 2014; 40 Pages.
Response (with Reporting Letter in English) to German Office Action dated May 18, 2015 for German Application No. 11 2009 004 394.1; Response filed Aug. 7, 2015; 77 Pages.
PCT International Search Report and Written Opinion dated Mar. 21, 2012 for International Application No. PCT/US2011/052861; 14 Pages.
PCT International Preliminary Report on Patentability dated Jun. 27, 2013 for International Application No. PCT/US2011/052861; 11 Pages.
German Office Action (with English Translation) dated Mar. 9, 2015 for German Application No. 112011104425.9; 18 Pages.
Response (with Amended Claims in English) to German Office Action dated Mar. 9, 2015 for German Application No. 112011104425.9; Response filed on Jul. 13, 2015; 27 Pages.
Japanese Office Action (with English Translation) dated Jul. 3, 2014 for Japanese Application No. 2013-544466; 8 Pages.
Response to Japanese Office Action (with English Claims) dated Jul. 3, 2014 for Japanese Application No. 2013-544466; Response filed Aug. 21, 2014; 11 Pages.
Japanese Office Action dated Feb. 5, 2015 (with English Translation) for Japanese Application No. 2013-544466; 5 Pages.
Appeal Brief and Response (with Reporting Letter & Amended Claims in English) to Japanese Office Action dated Feb. 5, 2015 for Japanese Application No. 2013-544455; Response filed on Mar. 20, 2015; 15 Pages.
Examiner's Pre-Trial Report (with English Translation) dated Jul. 3, 2015 for Japanese Application No. 2013-544466; 12 Pages.
Written Petition (with English Translation) filed on Aug. 26, 2015 for Japanese Application No. 2013-544466; 13 Pages.
International Search Report and Written Opinion dated Apr. 23, 2015 for International Application No. PCT/US2015/011347; 10 Pages.
International Search Report and Written Opinion dated Jun. 2, 2016 for International Application No. PCT/US2016/019451; 10 Pages.
International Search Report and Written Opinion dated Jul. 5, 2016 for International Application No. PCT/US2016/019457; 10 Pages.
Office Action dated Feb. 18, 2015 for U.S. Appl. No. 14/182,595; 18 Pages.
Response to Office Action dated Feb. 18, 2015 for U.S. Appl. No. 14/182,595; Response filed on May 13, 2015; 12 Pages.
Notice of Allowance dated Aug. 19, 2015 for U.S. Appl. No. 14/182,595; 21 Pages.
Office Action dated Nov. 13, 2015 for U.S. Appl. No. 14/645,946; 34 Pages.
Response to Office Action dated Nov. 13, 2015 for U.S. Appl. No. 14/645,946; Response filed on Mar. 11, 2016; 16 Pages.
Notice of Allowance dated Apr. 29, 2016 for U.S. Appl. No. 14/645,946; 9 Pages.
Office Action dated Jul. 6, 2016 for U.S. Appl. No. 14/645,946; 16 Pages.
Office Action dated May 23, 2013 for U.S. Appl. No. 12/968,353; 8 Pages.
Response to Office Action dated May 23, 2013 for U.S. Appl. No. 12/968,353; Response filed Jul. 18, 2013; 12 Pages.
Notice of Allowance dated Aug. 5, 2013 for U.S. Appl. No. 12/968,353; 7 Pages.
Honeywell, "3-Axis Digital Compass IC, HMC5883L;" Advanced Information; XP-002671326; Oct. 2010; 18 Pages.
Texas Instruments, "Digital Temperature Sensor with I²C™ Interface;" Burr-Brown Products; TMP100,TMP101; XP-002671327; Jan. 2002—Revised Nov. 2007; Package Option Addendum dated Aug. 20, 2011; 19 Pages.
SAE International, "Single Edge Nibble Transmission for Automotive Applications;" Surface Vehicle Information Report; SAE J2716 Jan. 2010; Issued Apr. 2007—Revised Jan. 2010; 56 Pages.
Phillips Semiconductors, "The I²C Bus Specification;" Version 2.1; XP-002590803; Jan. 2000; 46 Pages.
Texas Instruments, "TMS320x281x, 280x DSP Serial Peripheral Interface (SPI) Reference Guide;" Literature No. SPRU059B; XP-002369243; Issued Jun. 2002—Revised Nov. 2004; 50 Pages.
Infineon Technologies, "TLE4998C User Programming Guide;" Application Note, Rev. 1.0, Feb. 2009; 30 Pages.
"Peripheral Sensor Interface for Automotive Applications;" PSI5 Technical Specification, V1.3; Jul. 29, 2008; 47 Pages.
Korean Office Action with English translation dated Jul. 19, 2016 for Korean Application No. 10-2013-7015958; 7 pages.
German Office Action (with English Translation) dated May 18, 2015 corresponding to German Patent Application No. 112009004394.1; 33 Pages.
PCT International Preliminary Report dated Aug. 23, 2016 corresponding to International Application No. PCT/US2015/011347; 7 Pages.
Japanese Decision of Rejection dated Aug. 5, 2014 for Japanese Application No. JP 2012/526825; 2 pages.
Japanese Decision of Rejection English Translation dated Aug. 5, 2014 for Japanese Application No. JP 2012/526825; 2 pages.
Notice of Decision of Refusal dated Feb. 27, 2015 for Korean Application No. 10-2012-7007744; 7 pages.
Response to Notice of Decision of Refusal filed Jan. 27, 2015 for Korean Application No. 10-2012-7007744; 21 pages.
Appeal and Amendment with English Claims filed Dec. 3, 2014 for Japanese Application No. 2012-526825; 18 Pages.
Divisional Application with English Claims filed Dec. 3, 2014 for Japanese Application No. 2014-244745; 34 pages.
Response filed on Sep. 9, 2016, to Office Action dated Jul. 6, 2016; for U.S. Appl. No. 14/645,946; 16 pages.
European Patent Office Communication Pursuant to Rules 161(1) and 162 EPC dated Sep. 16, 2016, 2 pages.

\* cited by examiner

DETERMINING ADDRESSES OF ELECTRICAL COMPONENTS ARRANGED IN A DAISY CHAIN

RELATED APPLICATION

The application claims priority to and is a continuation application of U.S. patent application Ser. No. 12/354,891, filed on Jan. 16, 2009 and entitled "DETERMINING ADDRESSES OF ELECTRICAL COMPONENTS ARRANGED IN A DAISY CHAIN," which is incorporated herein in its entirety, and the present application is assigned to the assignee of the parent application.

BACKGROUND

A master-slave system includes a master circuit that controls one or more slave circuits. A master-slave system may be used in a number of applications. One such application is a sensor system having multiple sensor devices arranged along a two-wire bus in a daisy-chain arrangement. One wire of the two-wire bus includes a supply voltage and the other wire includes ground. Generally, the sensor devices function as slave circuits receiving commands from a master circuit. In this configuration, the two-wire bus is used for multiple purposes. One purpose is to provide power to the sensor devices while reducing the number of wires to avoid extra weight and to reduce the number of connections in a car, for example. Another purpose is to allow communication between the master circuit and the sensor devices. One important diagnostic feature includes the master circuit's ability to determine where in the daisy-chain arrangement a sensor has detected a fault. Therefore, it is important for an address of each sensor device to be determined. In one example, an addressing scheme should be simple in order to reduce cost.

SUMMARY

In one aspect, a system includes electrical components arranged in a daisy chain that include a first electrical component disposed at a first end of the daisy chain and a second electrical component disposed at an opposite end of the daisy chain than the first end. Each of the first and second electrical components includes an input port, an output port and a common port. The input port of the first electrical component is coupled to one of a supply voltage port or ground and the common ports of the first and second electrical components are coupled to the other one of the supply voltage or the ground. An address of the second electrical component is determined before addresses of the other of the electrical components are determined, and the addresses of the electrical components determine a position of an electrical component with respect to the other of the electrical components in the daisy chain.

In another aspect, a method includes determining addresses of slave components in a master-slave system that includes a master component and slave components in which a first slave component is disposed at a first end of the daisy chain and connected to the master component and a second slave component which is disposed at an opposite end of the daisy chain from the first end. The determining includes receiving at least one signal from the master component and determining the addresses of slave components arranged in the daisy chain based on the at least one signal by determining an address of the second slave component before determining addresses of the other of the slave components and by determining a position of a slave component with respect to the other of the slave components.

In a further aspect, an electrical component disposed in a daisy chain includes an input port, an output port, a third port and a current detection circuit connected to the input port, the output port and the common port. The current detection circuit is configured to measure an output current at the output port. The electrical component also includes a counter used to determine an address of the electrical component, a sensor circuit and a control logic circuit connected to the input port, the current detection circuit, the counter and the sensor circuit. The control logic circuit is configured to determine the address of the electrical component based on the output current, and the address of the electrical component determines a position of the electrical component with respect to other electrical components disposed in the daisy chain.

In a still further aspect, an article includes a machine-readable medium that stores executable instructions to determine an address of an unknown slave component in a master-slave system that includes a master component and slave components in which a first slave component is disposed at a first end of the daisy chain and connected to the master component and a last slave component is disposed at an opposite end of the daisy chain from the first end. The instructions causing a machine to receive at least one signal from the master component and determine the address of the unknown slave component arranged in the daisy chain based on the at least one signal. The instructions causing a machine to determine the address of the unknown slave component includes instructions causing a machine to determine the address of the unknown slave component before determining addresses of the other of the slave components if the unknown slave component is the last slave component. The instructions causing a machine to determine the address of the unknown slave component includes instructions causing a machine to determine a position of the unknown slave component with respect to the other of the slave components.

In another aspect, a system includes electrical components arranged in a daisy chain and including a first electrical component disposed at a first end of the daisy chain and a second electrical component disposed at an opposite end of the daisy chain than the first end. Each of the first and second electrical components includes an input port, an output port and a third port. The input port of the first electrical component is coupled to one of a supply voltage port or ground and the third port of the first electrical component is coupled to the other one of the supply voltage or the ground. An address of the second electrical component is determined before addresses of the other of the electrical components are determined and the addresses of the electrical components determine a position of an electrical component with respect to the other of the electrical components in the daisy chain.

DESCRIPTION OF THE DRAWINGS

The foregoing features of the invention, as well as the invention itself may be more fully understood from the following detailed description of the drawings, in which.

DETAILED DESCRIPTION

Described herein are techniques for a system including electrical components arranged in a daisy chain (called herein a daisy chain system) that independently determine their own address. In particular, the electrical components determine their own respective addresses in turn starting with the electrical component furthest from a power source (e.g., a master component) in the daisy chain (called herein a last electrical component) and working down the daisy chain until all the electrical components have an address. The techniques described herein provide a number of advantages. One advantage is that the electrical components are self-addressable, meaning each electrical component determines its own address. In one example, the address defines a position of an electrical component in the daisy chain with respect to the other electrical components. Another advantage is that each electrical component may be fabricated generically so that if an electrical component fails anywhere in the daisy chain system, it can be easily replaced by any other electrical component without any modifications. A further advantage is that the daisy chain system does not need to know the number of electrical components present in the daisy chain. Other advantages will be apparent to one of ordinary skill in the art.

Figure 8:
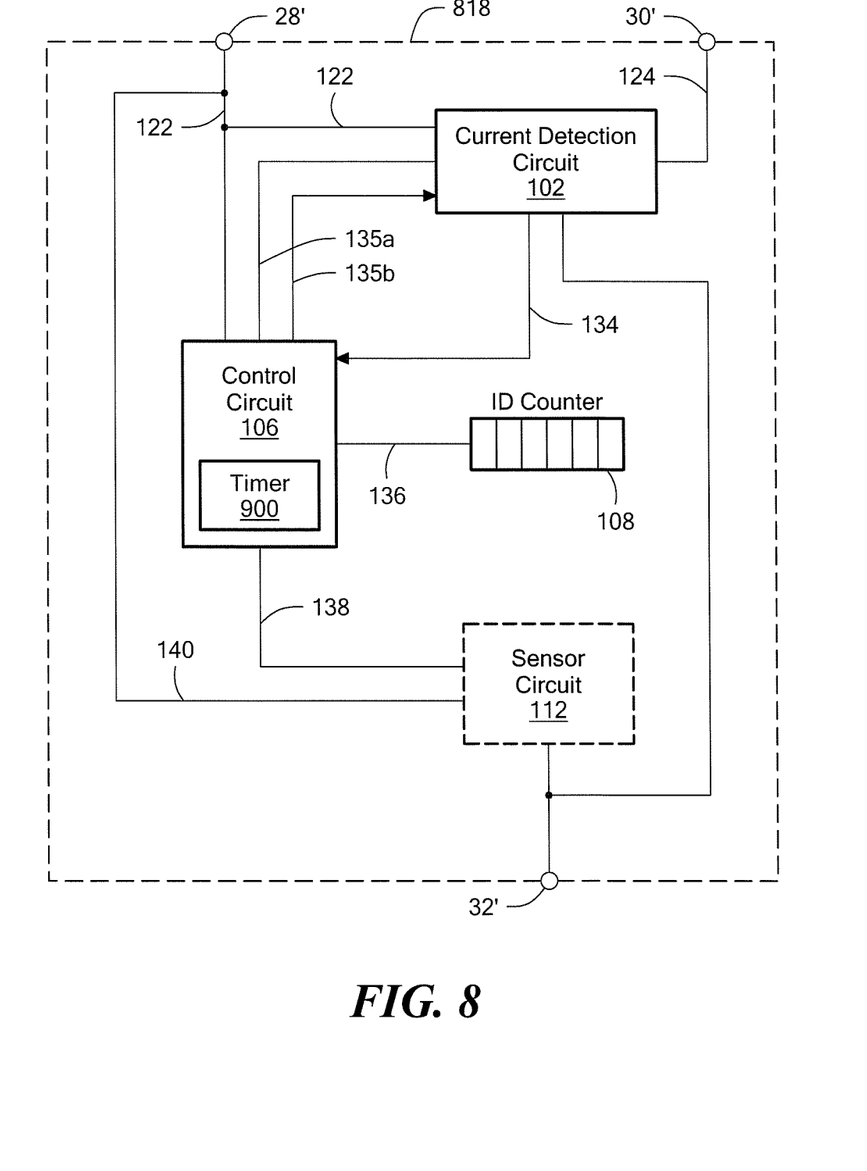
FIG. 8 is an example of an electrical component is a daisy chain system.

Described herein is one specific embodiment of the daisy chain system, a master-slave system including a master component and slave components. In the master-slave system, the slave components determine their own respective addresses in turn starting with the slave component furthest from the a master component in the daisy chain (called herein a last slave component). Other embodiments do not require a master-slave system. For example, electrical components may independently determine their addresses at power-up without the function of a master component being required (FIG. 8).

Figure 1:
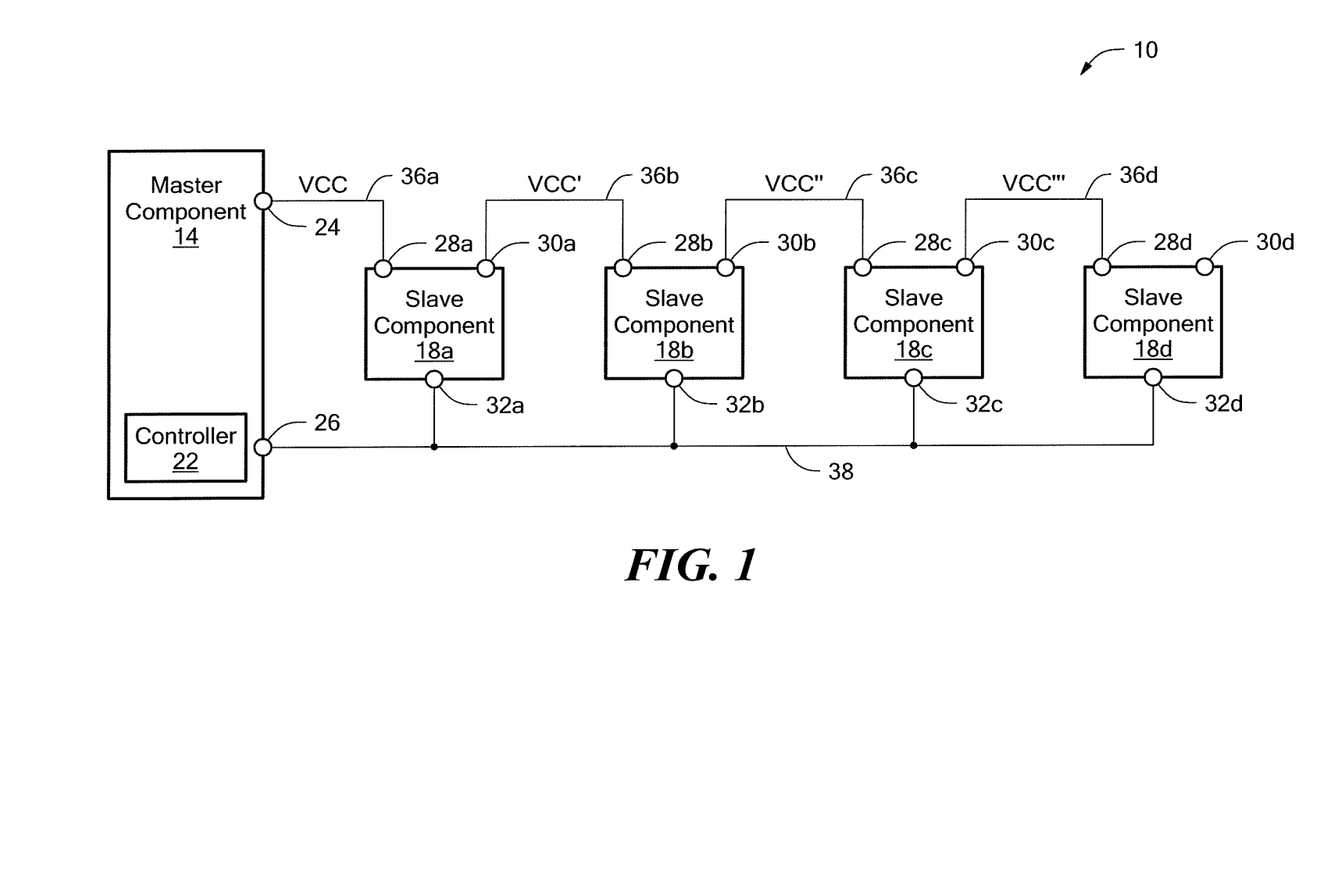
FIG. 1 is a diagram of an example of a master-slave system.

Referring to FIG. 1, a master-slave system 10 includes a master component 14 connected to slave components (e.g., a slave component 18a, a slave component 18b, a slave component 18c and a slave component 18d). For simplicity, only four slave components are described; however, one of ordinary skill in the art can modify the number of slave components to include any number of slave components.

The master component 14 includes a controller 22. The master component 14 provides a supply signal, $V_{CC}$, at a port 24 and ground, a GND, at a port 26. The controller 22 provides commands to the slave components 18a-18d. The commands include, for example, a wake-up command to wake the slave components 18a-18d from a sleep mode. Another command is a reset command to reset circuitry within the slave component. A further command is a determine address command instructing the slave components to determine their addresses. The commands are sent by modulating the supply voltage, $V_{CC}$.

Each of the slave components 18a-18d includes a respective input port 28a-28d, an output port 30a-30d and a common port 32a-32d. The slave components 18a-18d are connected in a daisy-chain arrangement. For example, the port 24 of the master component 14 is connected to the input port 28a of the slave component 18a by a connection 36a, the output port 30a of the slave component 18a is connected to the input port 28b of the slave component 18b by a connection 36b, the output port 30b is connected to the input port 28c by a connection 36c and the output port 30c is connected to the input port 28d by a connection 36d. The port 26 of the master component 14 is connected to the common ports 32a-32d by a connection 38. In this arrangement, the master component 14 provides the supply voltage, $V_{CC}$, to the slave component 18a at the input port 28a, the slave component 18a provides a supply voltage, $V_{CC}'$, to the slave component 18b at the input port 28b, the slave component 18b provides a supply voltage, $V_{CC}''$, to the slave component 18c at the input port 28c and the slave component 18c provides a supply voltage, $V_{CC}'''$, to the slave component 18d at the input port 28d. In other embodiments, the common ports 32a-32d of the slave components 18a-18d may be connected in a daisy-chain arrangement with the port 26 of the master component 14.

The input of each of the input ports 28a-28d includes an input current, $I_{CC}$. The output of each of the output ports 30a-30d includes an output current, $I_{out}$. As will be further described below, each of the slave components 18-18d measures its output current, $I_{OUT}$, in order to determine if it is the last active slave component in the daisy chain and if so determines its address. As used herein, the last active slave component is defined as the slave component furthest from the master component 14 in the daisy chain that is not in a sleep mode.

Figure 4:
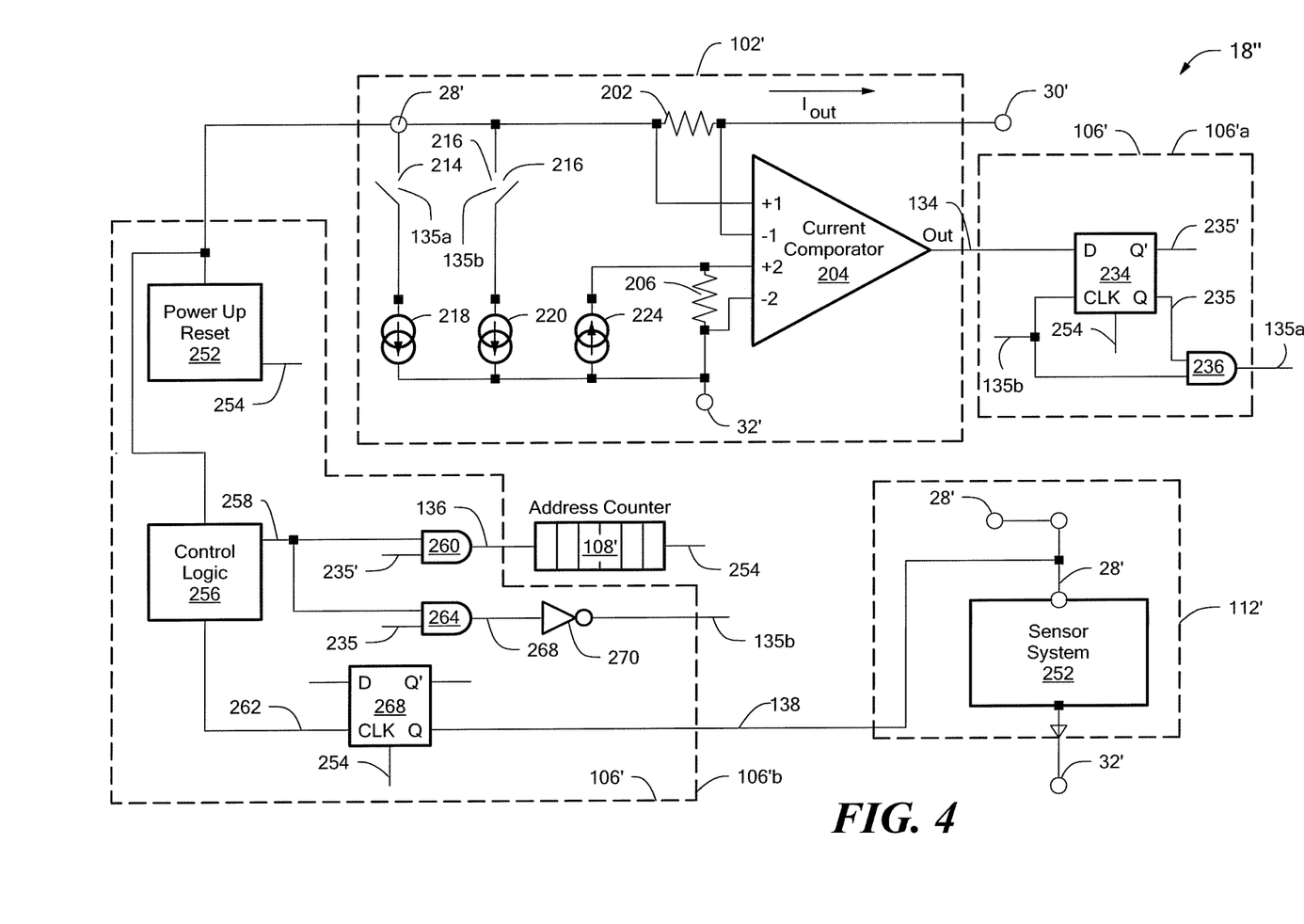
FIG. 4 is a circuit diagram of an embodiment of the slave component in FIG. 2.

It is important to note that initially for each slave component 18a-18d there is a current drop between its respective input port 28a-28d and output port 30a-30d that is equal to a start current. For example, as will be shown, the start current is generated by a start current source 220 (FIG. 4). In particular, if the current to the input port 28a from the master component 14 is four times the start current, then the current from the output port 30a is three times the start current, the current from output port 30b is two times the start current, the current from output port 30c is substantially equal to the start current and the current from the output port 30d is about zero. As will be further shown below, the slave component 18d will determine that it is the last active component in the daisy chain based on a current from the output port 30d (the output current, $I_{OUT}$, for the slave component 18d), determine its address and go into a sleep mode. In a next iteration, the slave component 18c will determine that it is the last active slave component in the daisy chain based on a current from the output port 30c (e.g., the output current, $I_{OUT}$, for the slave component 18c is about equal to zero since the slave component 18d is in the sleep mode), determine its address and go into the sleep mode. The iterations continue until the slave component 18a determines its address. In one example, during a first iteration for the first slave component 18d to determine its address, the current from the master component 14 to the slave component 18a is equal to N times the start current, where N is equal to the number of slave components 18a-18d in the system 10.

Figure 2:
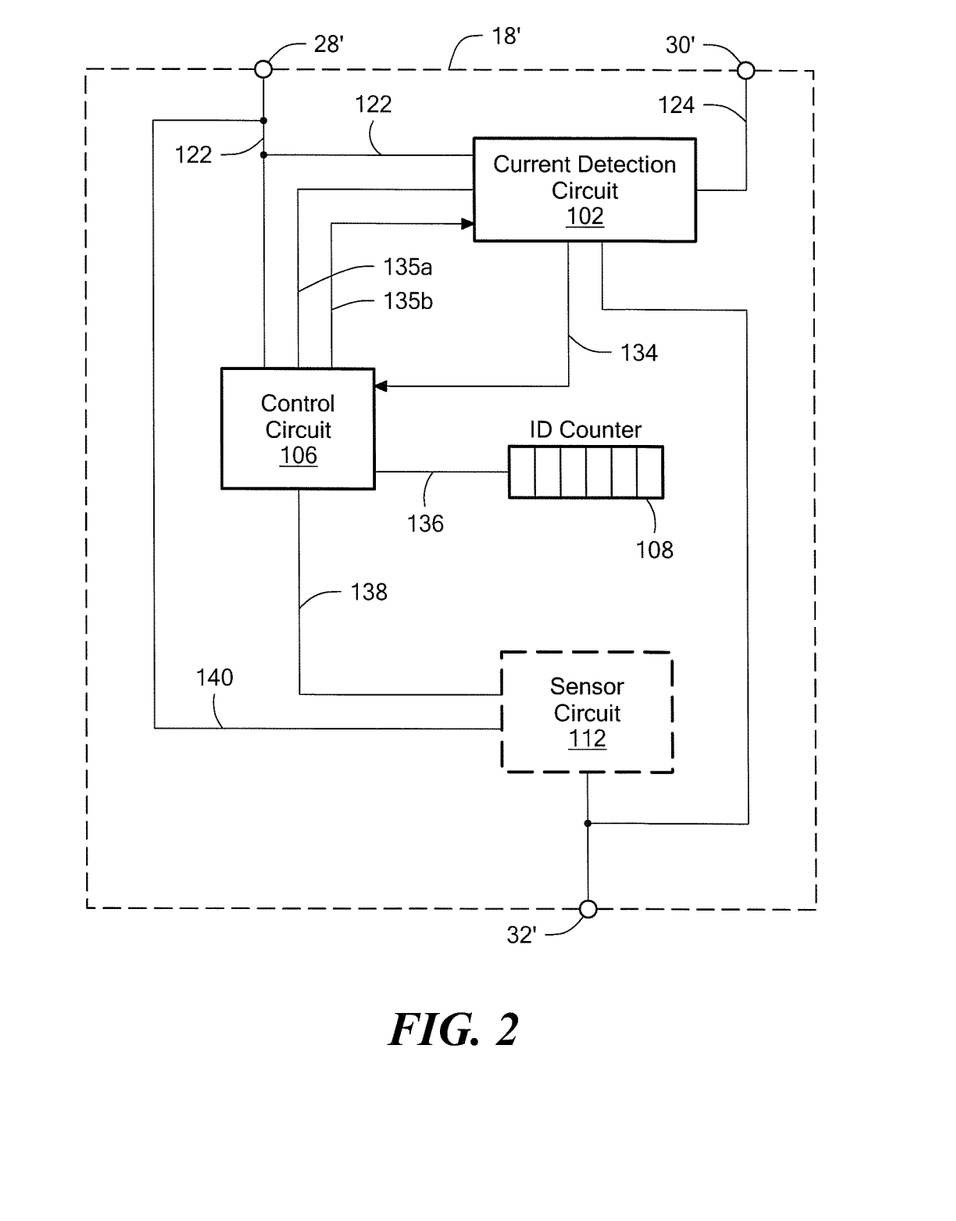
FIG. 2 is a functional block diagram of an example of a slave component.

Referring to FIG. 2, in one example, each of the slave components 18a-18d may be embodied as a slave component 18' configured to be a sensor device (e.g., a magnetic field sensor device used to detect a condition such as whether a seatbelt is fastened). The slave component 18' includes an input port 28', an output port 30', a common port 32', a current detection circuit 102, a control circuit 106, an ID counter 108 and a sensor circuit 112. The current detection circuit 102 receives the supply voltage provided at the input port 28' from a connection 122 with an input current, $I_{CC}$, and determines the output current, $I_{OUT}$, provided at the output port 30' through a connection 124. In one example, the current detection circuit 102 measures the current by sensing the voltage across a resistor (e.g., a resistor 202 in FIG. 4) having a relatively small resistance (e.g., 0.1 ohms). The sensor circuit 112 receives the supply voltage from the input port 28' from a connection 140 to power the sensor circuit 112.

The control circuit 106 is connected to the input port 28' by the connection 122, to the current detection circuit 102 by a connection 134, a connection 135a and a connection 135b, to a counter 108 by a connection 136 and to the sensor circuit 112 by a connection 138. The control circuit 106 receives protocol words from the controller 22 through the connection 122 by modulating the supply voltage. For example, the control circuit 106 receives a command from the controller 22 to increment the counter 108. In another example, the control circuit 106 receives a command from the master component 14 to awaken the sensor circuit 112. As will be shown below, the control circuit 106 determines if the slave component 18' is the last active slave component in the daisy chain based on the output current, $I_{OUT}$, detected by the current detection circuit 102. Once the slave component 18' determines that it is the last active component, it puts itself into a sleep mode.

The various connections described herein may be referred to herein interchangeably with the signal carried by the respective connection. For example, reference character 134 may be used interchangeably to refer to the connection between the current detection circuit 102 and the control circuit 106 and a signal associated with such a connection.

Figure 3:
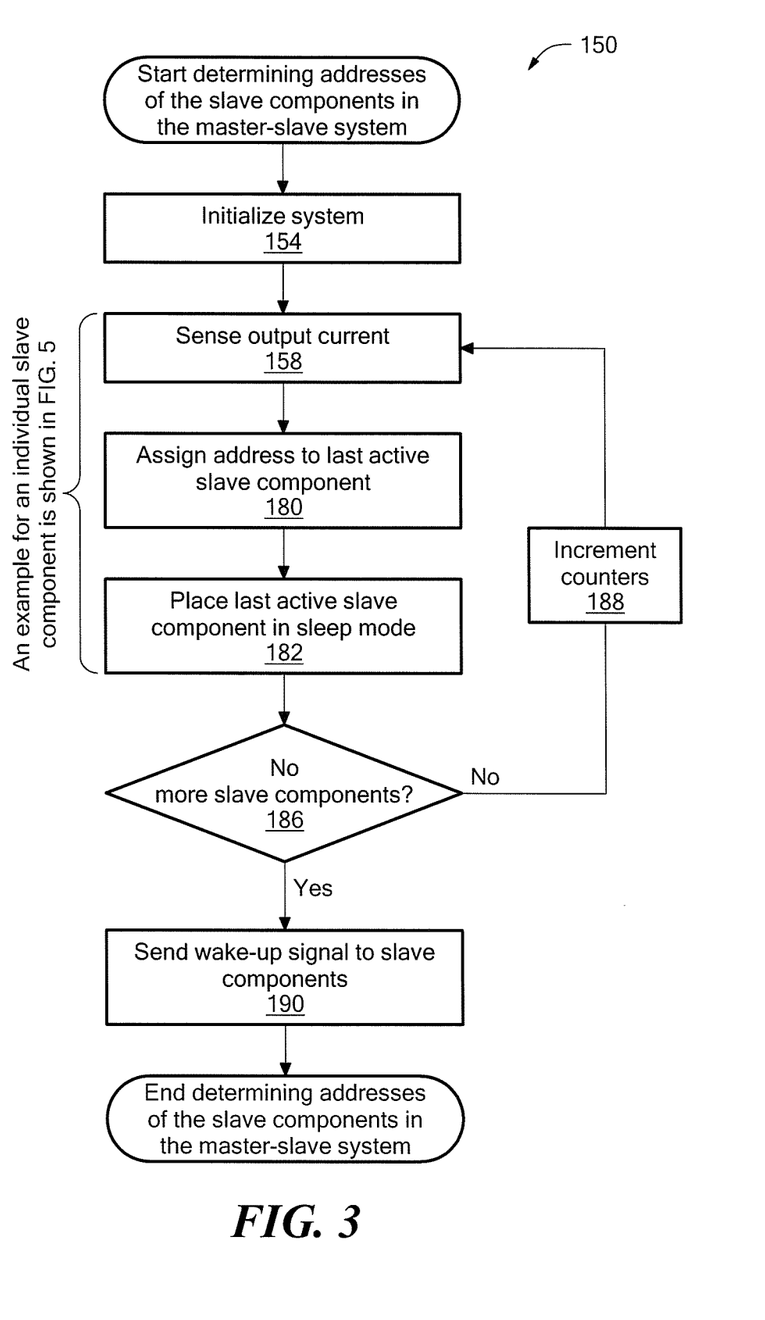
FIG. 3 is a flowchart of a process to determine addresses of slave components in the master-slave system.

Referring to FIG. 3, an example of a process to determine addresses of slave components 18a-18d in the master-slave system 10 is a process 150. The master-slave system 10 initializes the slave components 18a-18d (154). For example, the controller 22 sends a signal (e.g., the reset command) to the slave components 18a-18d to reset circuitry in the control circuit 106 and the counter 108.

In one example, after the reset command is enabled a general "Determine Address Command" is sent from the master component 14 to the slave components 18a-18d and a timer (not shown) is triggered. In one example, the timer could be either run by the master component or each slave component 18a-18d individually.

While the timer is "on," each of the slave components 18a-18d senses their respective output current, $I_{OUT}$ (158). In one example, those slave components that determine that they are the last active slave component set their input current, $I_{CC}$, to a high value. The increase in current acts as a positive feedback to avoid errors appearing from process and circuit variations. After the timer has elapsed, only one last active slave component is found. As will be further discussed below, only the true last active slave component will not detect changes in its output current, $I_{OUT}$.

The last active slave component assigns itself the address corresponding to the value stored in the counter 108 (180). Once the timer has elapsed, the last active slave component puts itself into a sleep mode (182). It is determined whether there are any more slave components left to determine their addresses (186). For example, it is determined if a number of iterations is equal to the number of slave components in the system 10. In another example, it is determined if the total $I_{CC}$ consumption seen by the master component 14 is lower than a predetermined current threshold thereby avoiding the need for the master component 14 to know the number of slave components 18a-18d within the system 10. If not, all counters of the remaining active slave components are incremented (188). For example, the counter 108 is incremented by one. If all of the slave components 18a-18d have assigned themselves an address, a wake-up signal is sent to the slave components (190). For example, the master component 14 sends the wake-up command using the supply voltage line, $V_{CC}$.

Figure 5:
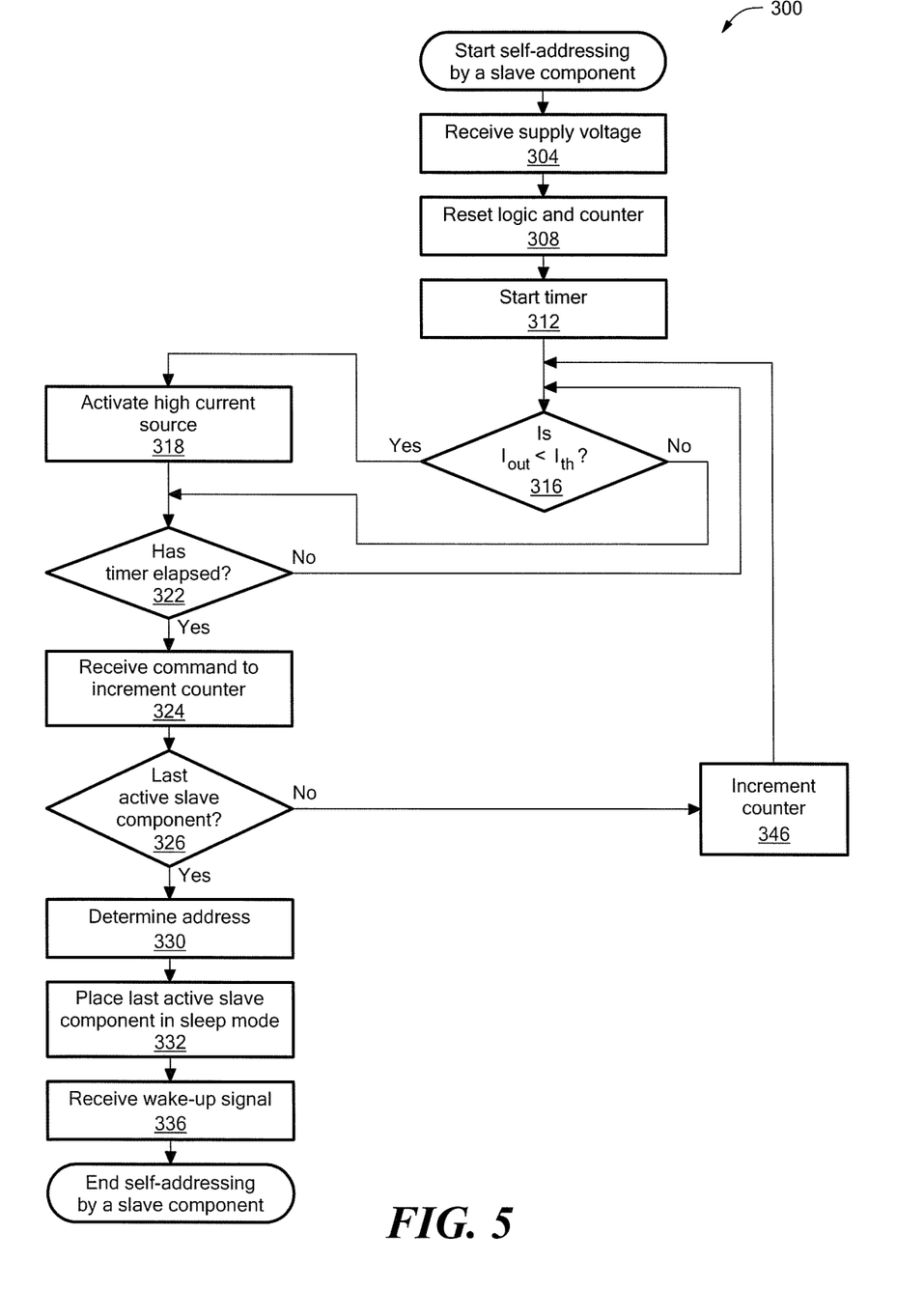
FIG. 5 is a flowchart of a self-addressing process to determine an address of the slave component.

In one example, the master component 14 performs processing block 154 including sending the "Determine Address Command." The individual slave components 18a-18d perform processing blocks 158, 180 and 182 (e.g., as shown in FIG. 5). The master component 14 performs processing block 186; and after determining that all the slave components 18a-18d have been addressed by sensing that the total $I_{CC}$ consumption is lower than the predetermined current threshold, performs processing block 190.

Referring to FIG. 4, in one particular embodiment, the slave component 18' may be a slave component 18" that includes a current detection circuit 102' (e.g., the current detection circuit 102 in FIG. 2), a control circuit 106' (e.g., the control circuit 106 in FIG. 2), a counter 108' (e.g., the counter 108 in FIG. 2) and a sensor circuit 112' (e.g., the sensor circuit 112 in FIG. 2).

The current detection circuit 102' includes the resistor 202, a resistor 206, a current comparator 204, a first switch 214, a second switch 216, a high current source 218 providing a high current, a start current source 220 providing a start current and a threshold current source 224 providing a threshold current, $I_{TH}$. In one example, the high current source 218 provides about ten times more current than the start current source 220 and the threshold current source 224 provides about half as much current as the start current source 220. As will be understood below, the threshold current, $I_{TH}$, must be chosen high enough to account for the slave components 18a-18d in a sleep mode drawing a relatively small amount of current. For example, the threshold current, $I_{TH}$, should be greater that (N−1) times the amount of current drawn by a slave component in the sleep mode, where N is equal to the number of slave components.

In one example, the start current source 220 is independent of other circuitry in the slave component 18". By having the start current source 220 independent, the master component 14 will be able to identify a failure of a slave component in the daisy chain. The first switch 214 is controlled by a signal 135a and the second switch 216 is controlled by a signal 135b each of which will be described below. In one example, the first switch 214 is turned "on" or activated (i.e., the first switch 214 is closed) when the signal 135a has a logical high voltage level. In one example, the second switch 216 is activated when the signal 135b has a logical high voltage level.

The current comparator 204 compares the output current, $I_{OUT}$, through the resistor 202 with the threshold current, $I_{TH}$, through a resistor 206 and provides a signal 134. In one example, if the output current, $I_{OUT}$, is greater than a threshold current, $I_{TH}$, the signal 134 is a logical high voltage level.

The control circuit 106' includes a first portion 106a' and a second portion 106b'. The first portion 106a' of the control circuit 106' includes a D flip flop circuit 234 and an AND gate 236. A D pin of the D flip-flop circuit 234 receives the signal 134 from the current comparator 204. A Q pin of the D flip-flop circuit 234 provides a signal 235 to the AND gate 236 while a Q' pin provides a signal 235', logically opposite to the signal 235. A clock pin of the D flip-flop circuit 234, CLK, receives a signal 135b from an inverter 270 and is further described below. The AND gate 236 receives the signal 135b and the signal 235 to generate the signal 135a.

The second portion 106b' of the control circuit 106' includes a power-up/reset circuit 252, a control logic circuit 256, an AND gate 260, an AND gate 264, a D flip-flop circuit 268 and the inverter 270. The power-up/reset circuit 252 provides a reset signal 254 to the counter 108', the D flip-flop circuit 234 and the D flip-flop circuit 268.

The control logic 256 provides an increase count signal 258 to the AND gates 260, 264 and a control signal 262 to the clock pin, CLK, of the D flip-flop circuit 268. The AND gate 260 receives the signal 235' and with the increase count signal 258 provides a count signal 136 to the counter 108'. The AND gate 264 receives the signal 235 and with the increase count signal 258 provides a signal 269 to the inverter 270 which in turn provides the signal 135b to the switch 216 and to the AND gate 234.

A D pin of the D flip-flop circuit 268 is held at a fixed logical state, for example, a logical high state. The D flip-flop circuit receives an operations signal 262 from the control logic circuit 256 at a clock pin, CLK. In one example, after all the slave components have determined their addresses and are in the sleep mode, the controller 22 provides a wake-up command to the slave circuits. The control logic circuit 256 interprets the command and provides the operations signal 262 to the clock pin, CLK of the D flip-flop circuit 268. A Q pin of the D flip-flop circuit 268 provides an awake signal 138 to the sensor circuit 112'. In particular, the sensor circuit 112' includes a switch 280 that is controlled by the awake signal 138. When the switch 280 is closed (i.e., in the "on" position) the supply voltage from the input port 28' is provided to a sensor system 282. In one example, the sensor system 282 is a magnetic field sensor system, for example, including at least one of a Hall sensor, a magnetoresistive sensor or a magnetic field transducer or any combination thereof. In other examples, the sensor system 282 may be other types of sensors, for example, for pressure, acceleration, gyroscopes and so forth.

Referring to FIG. 5, an example of a self-addressing process that the slave component 18'' may perform is a process 300. The slave component 18'' receives the supply voltage from the master component 14 (304). For example, the slave component 18'' receives the reset command through modulations in the supply voltage to reset the logic and the counter 108. The slave component 18'' resets the logic and the counter 108 (308). For example, the power-up/reset circuit 252 provides a reset signal 254 to the counter 108', the D flip-flop circuit 234 and the D flip-flop circuit 268. In one example, the initial conditions include the switch 216 being closed, the switch 214 being open, the switch 280 being open, the counter 108 storing a zero value, the signal 135a having a low logic state, the signal 135b having a high logic state, the signal 235 having a low logic state, the increment count signal 258 having a low logic state and the operations signal 262 being at a low logic state.

The slave component starts a timer (not shown) (312). For example, the timer is et for 10 milliseconds. The slave component 18'' determines, if the output current, $I_{OUT}$, is less than the threshold current, $I_{TH}$ (316). For example, after the control circuit 106' receives the determine address command from the controller 22 (e.g., by modulating the supply voltage), the current comparator 204 compares the current through the resistor 202 (the output current) with the current through the resistor 206 (the threshold current).

If the output current, $I_{OUT}$, is less than the threshold current, $I_{TH}$, then the high current source 218 is activated (318). For example, the current comparator 204 sends the signal 134 (e.g., at a high logic state) to the D flip-flop circuit 234 which provides the signal 235 (e.g., at a high logic state) to the AND gate 264. With the signal 135b (e.g., at a high logic state), the AND gate 264 provides the signal 135a (e.g., at a high logic state) to the switch 214 to close the switch thereby connecting the high current source 218 to the input port 28'. With the switch 214 closed and the switch 216 closed, $I_{CC}$, becomes equal to the current generated by both the high current source 218 and the start current source 220.

Setting the input current, $I_{CC}$, to a higher current reduces the situation that two slave components (in particular, consecutive slave components) are each determining that they are the last active slave component. For example, manufacturing tolerances in the current comparator 204 and the start current source 220 may cause two slave components to determine that they are the last active slave component. By setting the input current, $I_{CC}$, to a higher current value only the real last active slave component will not see a variation with its output current, $I_{OUT}$, while the slave component before the real last active slave component will detect a substantial increase in its output current, $I_{OUT}$. For example, the slave component prior to the real last active slave component will detect an increase in its output current, $I_{OUT}$, because of the greater draw in current due to the high current source 218 in the real active slave component. Thus, the current comparator 204 in the slave component prior to the real last active slave component will now determine that $I_{OUT} > I_{TH}$ and change the logical state of the signal 234 (e.g., from a high logic state to a low logic state) provided to the control circuit 106.

It is determined whether the timer has elapsed (322). If the timer has not elapsed then processing block 316 is repeated.

After the timer has elapsed, the slave component 18'' receives a command from the controller 22 to increment the counter (324) and determines if it is the last active slave component (326). For example, the control logic 256 receives the command and provides the increment count signal (e.g., at a high logic state) to the AND gates 260, 264. In one example, the controller 22 sends the command to increment the counter at time intervals equal to the predetermined time for a number of time intervals equal to the number of slave components 18a-18d in system 10. In another example, the master component 14 could check for the total $I_{CC}$ current in the system 10 to go lower than a certain value to determine that all slave components 18a-18d in the system are in sleep mode and therefore all the slave components have obtained their respective addresses. Therefore, the master component 14 does not need to know the number of slaves within the system 10.

If the slave component 18'' is the last active slave component, the slave component 18'' determines its address (330). For example, the address is equal to a value stored in the counter 108'. If it is the last active slave component, the slave component 18'' goes into a sleep mode (332). For example, the AND gate 264, with the increase count signal (e.g., at a high logic state) and the signal 235 (e.g., at a high logic state), provides the signal 269 to the inverter 270 which in turn provides the signal 135b (e.g., at a low logic state) to open the switch 216 thereby disconnecting the stall current source 220 from the port 28'. In addition, the signal 135b is provided to the AND gate 236 which provides the signal 135a (e.g., a low logic state) to the switch 214 thereby disconnecting the high current source from the port 28'. Thus, the input current, $I_{CC}$, is zero.

The slave component 18" receives a wake-up signal (336). For example, the controller 22 provides the wake-up command. The control logic circuit 256 interprets the command and provides the operations signal 262 (e.g., at a high logic state) to the clock pin, CLK, of the D flip-flop circuit 268. The Q pin of the D flip-flop circuit 268 provides the awake signal 138 (e.g., at a high logic state) to close the switch 280 thereby providing the supply voltage from the input port 28' to the sensor system 282.

If the slave component 18" is not the last active slave component, then the counter 108 is incremented (346). For example, with the signal 235' (e.g., at a logical high state), the AND gate 260 provides the count signal 136 (e.g., at a high logic state) to the counter 108' to increment the counter.

Figure 6:
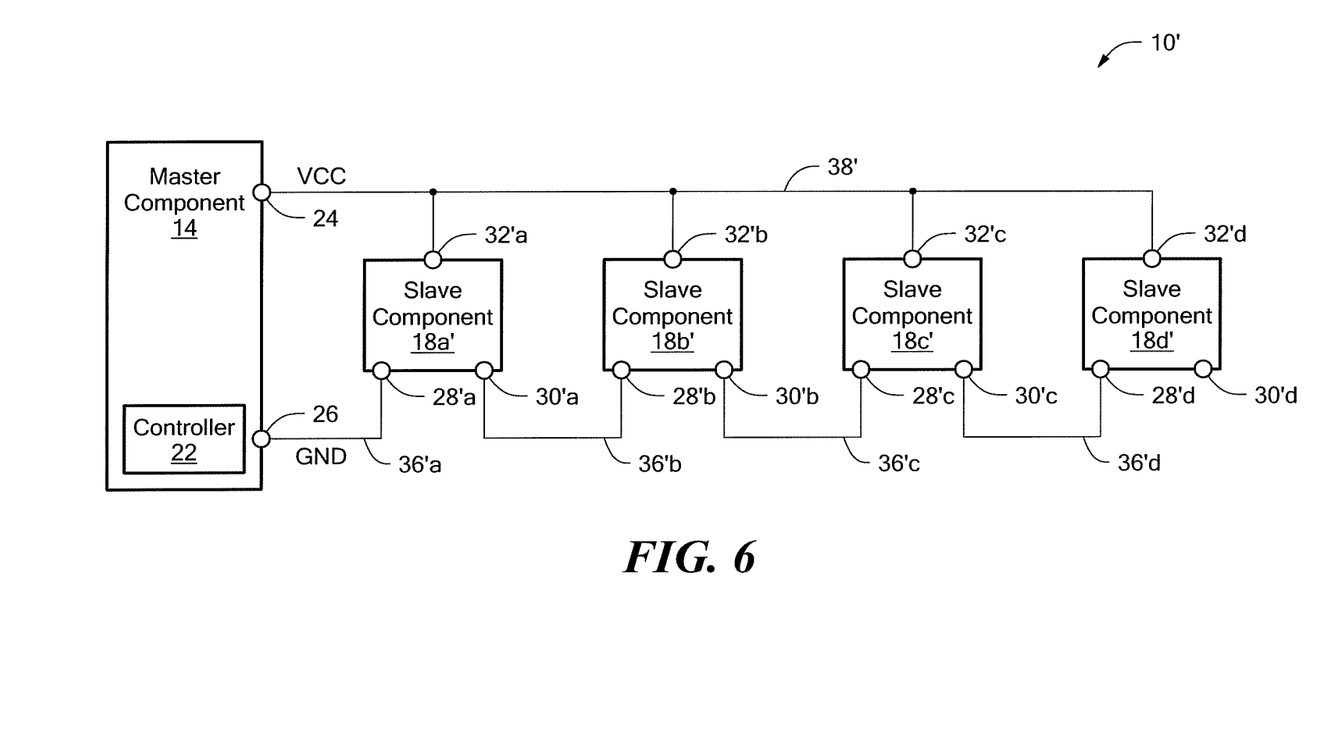
FIG. 6 is a diagram of another example of the master-slave system.

Referring to FIG. 6, one skilled in the art would recognize that system 10 in FIG. 1 may be modified so that instead of the master component 14 and the slave components 18a-18d sharing a common ground connection, a system 10' may be implemented that share a common supply voltage. In particular, the system 10' includes slave components 18a'-18d'. Each of the slave components 18a'-18d' includes a respective input port 28a'-28d', an output port 30a'-30d' and a common port 32a'-32d'. The slave components 18a'-18d' are connected in a daisy-chain arrangement. For example, the port 26 of the master component 14 (for ground, GND) is connected to the input port 28a' of the slave component 18a' by a connection 36a', the output port 30a' of the slave component 18a' is connected to the input port 28b' of the slave component 18b' by a connection 36b', the output port 30b' is connected to the input port 28c' by a connection 36c' and the output port 30c' is connected to the input port 28d' by a connection 36d'. The port 24 of the master component 14 supplying the supply voltage, $V_{CC}$, is connected to the ground ports 32a-32d by a connection 38'.

Figure 7:
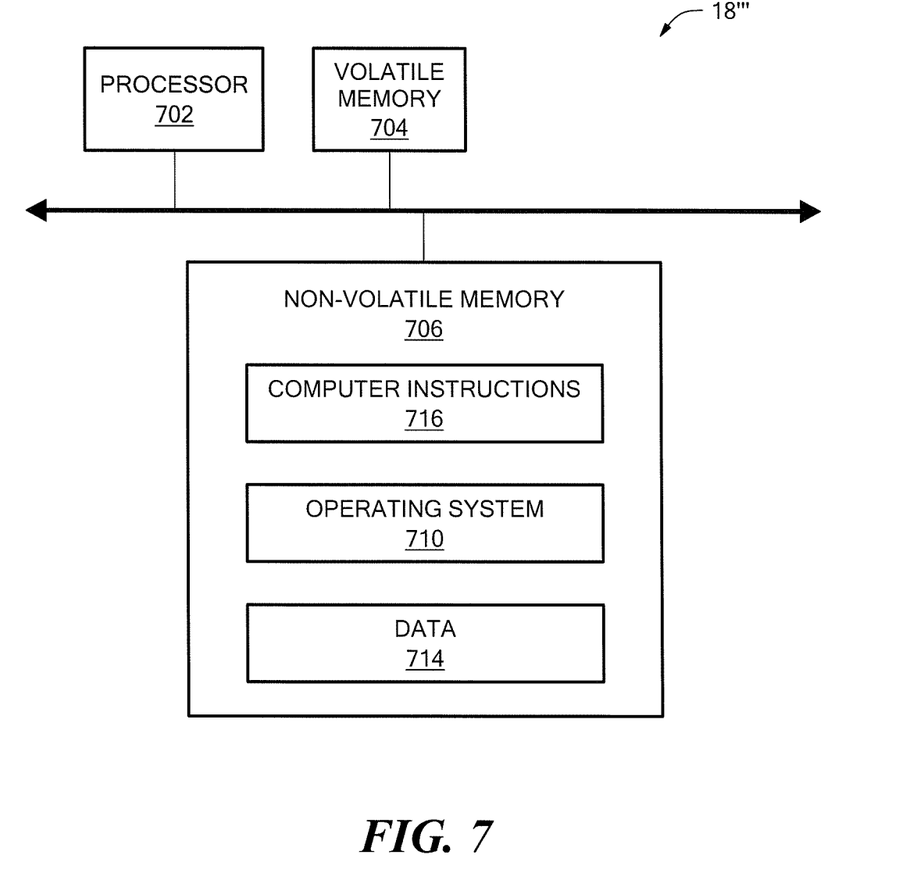
FIG. 7 is a computer embodiment of the slave component on which the process of FIG. 5 may be implemented.

FIG. 7 shows an embodiment of the slave component 18''', which may be used to execute all or part of the process 300. Computer 18''' includes a processor 702, a volatile memory 704 and a non-volatile memory 706 (e.g., a hard disk, a flash memory or a magnetoresistive random access memory (MRAM) and so forth). Non-volatile memory 706 includes an operating system 710, data 714, and computer instructions 716 which are executed out of volatile memory 704 to perform process 300 or portions of process 300.

Process 300 is not limited to use with the hardware and software of FIG. 7; it may find applicability in any computing or processing environment and with any type of machine or set of machines that is capable of running a computer program. Process 300 may be implemented in hardware, software, or a combination of the two. Process 300 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 300 and to generate output information.

The system may be implemented, at least in part, via a computer program product. For example, a computer program may be deployed to be executed on one computer or on multiple computers at one site or distributed across multiple sites and interconnected by a communication network. A computer program may be stored on a storage medium or device (e.g., a CD-ROM, a hard disk, a magnetic diskette or flash memory storage device) that is readable by a general or special purpose programmable computer for configuring and operating the computer when the storage medium or device is read by the computer to perform process 300. Process 300 may also be implemented as a machine-readable storage medium, configured with a computer program, where upon execution, instructions in the computer program cause the computer to operate in accordance with process 300.

The processes described herein are not limited to the specific embodiments described herein. For example, the processes are not limited to the specific processing order of the processing blocks in FIGS. 3 and 5. Rather, any of the processing blocks of FIGS. 3 and 5 may be re-ordered, combined or removed, performed in parallel or in serial, as necessary, to achieve the results set forth above.

Referring to FIG. 8, in other embodiments, each electrical component 818 in a daisy chain may be configured like the slave component 18' and further include a timer 900. In this configuration, a master component 14 is not required to control the addressing. Rather, each electrical component goes into a self-addressing mode (e.g., process 300 in FIG. 5) when first powered up. The timer 900 runs in an asynchronous operation so that each electrical component 818 in the daisy chain has sufficient time to determine its respective address. Each electrical component 818 part will individually increase its respective counter 108 if it determines it is not the last electrical component. Thus, a master component 14 is not needed as a constitutive part and can just simply poll the electrical components for the addresses after self-addressing is complete. In one example, the master component 14 is a computer in a car. In one example, the timer 900 is within the control circuit 106; however, the timer 900 may be located anywhere within the electrical component 818 including being a separate circuit.

Elements of different embodiments described herein may be combined to form other embodiments not specifically set forth above. Other embodiments not specifically described herein are also within the scope of the following claims.

What is claimed is:
1. A system, comprising:
   electrical components arranged in a daisy chain and comprising:
      a first electrical component disposed at a first end of the daisy chain; and
      a second electrical component disposed at an opposite end of the daisy chain than the first end, each of the first and second electrical components comprising:
         an input port;
         an output port; and
         a common port,
   wherein the first electrical component is directly coupled to a master component by no more than two connections comprising a first connection and a second connection,
   wherein the input port of the first electrical component is directly coupled to one of a supply voltage port of the master component or a ground port of the master component by the first connection and the common ports of the first and second electrical components are coupled to the other one of the supply voltage of the master component or the ground port of the master component by the second connection,
   wherein each electrical component is configured to determine its own address, and
   wherein an address of the second electrical component is determined by the second electrical component before addresses of the other of the electrical components are determined and the addresses of the electrical compo- nents determine a position of an electrical component with respect to the other of the electrical components in the daisy chain,
wherein the current detection circuit comprises:
a first resistor;
a second resistor;
a first current source configured to provide a threshold current to the first resistor;
a second current source coupled to the input port through a first switch and configured to provide a start current and
a comparator configured to compare the output current with the threshold current.

2. The system of claim 1 wherein each of the electrical components further comprises a timer set to a predetermined time and the electrical components are configured to determines their respective addresses at power-up within the predetermined time.

3. The system of claim 1 wherein the electrical components are slave components, the first electrical component is a first slave component and the second electrical component is a second slave component, and further comprising:
a master component comprising:
a supply voltage port to provide the supply voltage; and
a ground port to supply the ground.

4. The system of claim 1 wherein a current from the supply voltage port of the master component is equal to N times the start current, where N is equal to a number of slave components in the daisy chain.

5. The system of claim 1 wherein the current detection circuit further comprises a third current source coupled to the input port through a second switch and configured to provide a high current, the high current being greater than the start current,
wherein the second switch is turned on when the comparator determines that the output current is less than the threshold current.

6. The system of claim 5 wherein the threshold current is equal to about half of the start current and the high current is equal to about ten times the start current.

7. A method, comprising:
determining addresses of slave components in a master-slave system comprising a master component and slave components in which a first slave component is disposed at a first end of the daisy chain and directly coupled to the master component by no more than two connections and a second slave component is disposed at an opposite end of the daisy chain from the first end, the determining comprising:
receiving at least one signal from the master component; and
determining the addresses of slave components arranged in the daisy chain based on the at least one signal by determining an address of the second slave component before determining addresses of the other of the slave components and by determining a position of a slave component with respect to the other of the slave components,
wherein each slave component determines its own address,
wherein if the output current is less than the threshold current, determining the addresses for each of the first and second slave components further comprises:
increasing an input current to a value higher than the first current value;
determining the address based on the counter value; and
placing the slave component in a sleep mode.

8. The method of claim 7 wherein each of the first and second slave components comprises an input port, an output port, a counter, a current detection circuit and a control logic circuit, and
wherein determining the addresses further comprises, for each of the first and second slave components:
receiving an input current at the input port having a first current value;
sensing an output current at the output port; and
comparing the output current to a threshold current.

9. The method of claim 8 wherein determining the addresses for each slave component further comprises if the output current is greater than the threshold, current incrementing a value stored in the counter.

10. The method of claim 8 wherein comparing the output current to a threshold current comprises comparing the output current to the threshold current having a current equal to about one-half as much as the first current value.

11. The method of claim 10 wherein increasing an input current to a value higher than the first current value comprises increasing an input current to a value equal to about ten times the first current value.

12. The method of claim 11 wherein increasing an input current to a value higher than the first current value comprises activating a current source connected to the input port.

13. An electrical component disposed in a daisy chain, comprising
an input port;
an output port;
a third port;
a current detection circuit connected to the input port, the output port and the third port and configured to measure an output current at the output port;
a counter used to determine an address of the electrical component;
a sensor circuit; and
a control logic circuit coupled to the input port, the current detection circuit, the counter and the sensor circuit,
wherein the control logic circuit is configured to determine the address of the electrical component based on the output current,
wherein the address of the electrical component determines a position of the electrical component with respect to other electrical components disposed in the daisy chain,
wherein the electrical component is configured to determine its address first if disposed with other like electrical components in a daisy chain at an opposite end of the daisy chain from an electrical component directly coupled to a master component by no more than two connections,
wherein a current from the master component is equal to N times a start current, where N is equal to a number of slave components in the daisy chain.

14. The electrical component of claim 13, further comprising a timer set to a predetermined time, and
wherein the electrical component is configured to determine its respective address at power-up within the predetermined time.

15. The electrical component of claim 13 wherein the current detection circuit further comprises a third current source connected in series with a second switch to the input port and configured to provide a high current, the high current being greater than the start current,
wherein the second switch is turned on when the comparator determines that the output current is less than the threshold current.

16. The electrical component of claim 15 wherein the threshold current is equal to about one-half of the start current and the high current is about equal to ten times the start current.

17. The electrical component of claim 13 wherein the control logic circuit is configured to determine the address of the electrical component based on the output current and at least one command received from a master component.

18. The electrical component of claim 17 wherein the control circuit further comprises:
 a reset circuit configured to reset the counter and circuitry in the control circuit; and
 a control logic circuit configured to receive the at least one command and to provide control signals based on the at least one command.

19. The electrical component of claim 13 wherein the sensor circuit is a magnetic field sensor circuit.

20. An article comprising:
 a non-transitory machine-readable medium that stores executable instructions to determine an address of an unknown slave component in a master-slave system comprising a master component and slave components in which a first slave component is disposed at a first end of the daisy chain and directly coupled to the master component by no more than two connections and a last slave component is disposed at an opposite end of the daisy chain from the first end, the instructions causing the unknown slave component to:
 receive at least one signal from the master component; and
 determine the address of the unknown slave component arranged in the daisy chain based on the at least one signal,
 wherein the instructions causing the unknown slave component to determine the address of the unknown slave component comprises instructions causing the unknown slave component to determine the address of the unknown slave component before determining addresses of the other of the slave components if the unknown slave component is the last slave component, and
 wherein the instructions causing the unknown slave component to determine the address of the unknown slave component comprises instructions causing the unknown slave component to determine a position of the unknown slave component with respect to the other of the slave components,
 wherein the instructions causing the unknown slave component to determine the address of the unknown slave component further comprises instructions causing the unknown slave component to increment a value stored in the counter if the output current is greater than the threshold current.

21. The article of claim 20 wherein the unknown slave component comprises an input port, an output port, a counter, a current detection circuit and a control logic circuit, and
 wherein the instructions causing the unknown slave component to determine the address of the unknown slave component further comprises instructions causing the unknown slave component to:
 receive an input current at the input port having a first current value;
 sense an output current at the output port; and
 compare the output current to a threshold current.

22. The article of claim 21 wherein if the output current is less than the threshold current, and further comprising instructions causing the unknown slave component to:
 increase an input current to a value higher than the first current value;
 determine the address based on the counter value; and
 placing the slave component in a sleep mode.

23. The article of claim 20 wherein the instructions causing the unknown slave component to compare the output current to a threshold current comprises instructions causing the unknown slave component to compare the output current to the threshold current having a current equal to about one-half as much as the first current value.

24. The article of claim 23 wherein the instructions causing the unknown slave component to increase an input current to a value higher than the first current value comprises instructions causing the unknown slave component to increase an input current to a value equal to about ten times the first current value.

25. The article of claim 24 wherein the instructions causing the unknown slave component to increase an input current to a value higher than the first current value comprises instructions causing the unknown slave component to activate a current source connected to the input port.

* * * * *

UNITED STATES PATENT AND TRADEMARK OFFICE
CERTIFICATE OF CORRECTION

PATENT NO. : 9,552,315 B2
APPLICATION NO. : 13/344959
DATED : January 24, 2017
INVENTOR(S) : Gerardo Monreal It is certified that error appears in the above-identified patent and that said Letters Patent is hereby corrected as shown below:

Column 2, Line 26, delete "causing" and replace with --cause--

Column 3, Line 9, delete "is a daisy" and replace with --in a daisy--

Column 3, Line 42, delete "from the a" and replace with --from the--

Column 4, Line 26, delete "18-18d" and replace with --18a-18d--

Column 6, Line 40, delete "that" and replace with --than--

Column 7, Line 11, delete "logic 256" and replace with --logic circuit 256--

Column 7, Line 60, delete "et" and replace with --set--

Column 8, Line 62, delete "stall" and replace with --start--

Column 11, Line 16-17, delete "to determines" and replace with --to determine--

Signed and Sealed this
Twenty-sixth Day of December, 2017

Joseph Matal
*Performing the Functions and Duties of the
Under Secretary of Commerce for Intellectual Property and
Director of the United States Patent and Trademark Office*